(12) United States Patent
Lee

(10) Patent No.: US 10,589,634 B2
(45) Date of Patent: Mar. 17, 2020

(54) BATTERY ELECTRIC VEHICLE

(71) Applicant: LINENG-TECH CORPORATION, Hsinchu (TW)

(72) Inventor: Chih-Yu Lee, Hsinchu (TW)

(73) Assignee: LINENG-TECH CORPORATION, Hsinchu (TW)

( * ) Notice: Subject to any disclaimer, the term of this patent is extended or adjusted under 35 U.S.C. 154(b) by 15 days.

(21) Appl. No.: 15/088,053

(22) Filed: Mar. 31, 2016

(65) Prior Publication Data
US 2017/0210242 A1    Jul. 27, 2017

(30) Foreign Application Priority Data

Jan. 22, 2016 (TW) .............................. 105102005 A

(51) Int. Cl.
| | | |
|---|---|---|
| B60L 11/18 | (2006.01) |
| B60L 11/00 | (2006.01) |
| B62M 7/02 | (2006.01) |
| B60K 1/00 | (2006.01) |
| B60K 1/04 | (2019.01) |
| B60K 7/00 | (2006.01) |
| B60L 7/10 | (2006.01) |

(Continued)

(52) U.S. Cl.
CPC ............ B60L 11/1864 (2013.01); B60K 1/00 (2013.01); B60K 1/04 (2013.01); B60K 7/0007 (2013.01); B60L 7/10 (2013.01); B60L 58/12 (2019.02); B60L 58/21 (2019.02); B62M 7/02 (2013.01); *B60L 2200/12* (2013.01); *B60L 2220/42* (2013.01); *B60Y 2200/12* (2013.01); *B60Y 2200/126* (2013.01); *B62K 2202/00* (2013.01); *B62K 2204/00* (2013.01); *Y02T 10/646* (2013.01); *Y02T 10/7005* (2013.01); *Y02T 10/7044* (2013.01); *Y02T 10/7061* (2013.01)

(58) Field of Classification Search
CPC .......... B60L 11/1864; B60K 1/00; B60K 1/04
USPC .......................................................... 701/22
See application file for complete search history.

(56) References Cited

U.S. PATENT DOCUMENTS

| | | | | |
|---|---|---|---|---|
| 6,886,647 B1 * | 5/2005 | Gotta | ....................... | B60K 1/02 180/65.1 |
| 2005/0082095 A1 * | 4/2005 | Tamai | ...................... | B60L 1/00 180/65.1 |

(Continued)

*Primary Examiner* — Khoi H Tran
*Assistant Examiner* — Rodney P King
(74) *Attorney, Agent, or Firm* — Lin & Associates Intellectual Property, Inc.

(57) ABSTRACT

A battery electric vehicle provided in the present invention comprises a vehicle body having wheels, an electric motor, an electric generator, and an electricity management device. The electric motor and the electric generator are connected to different wheels of the vehicle body respectively. The electric generator generates electricity by converting the rotational kinetic energy of the wheel into electrical energy. The electricity management device includes a management and controlling member, a detecting member, and a plurality of battery packs. The management and controlling member controls at least one of the battery packs to provide electricity to the electric motor by electrically connecting the electric motor, while the management and controlling member controls at least one battery pack of other battery packs to be charged by receiving the electricity generated by means of electrically connecting to the electric generator.

7 Claims, 3 Drawing Sheets

(51) Int. Cl.
*B60L 58/21* (2019.01)
*B60L 58/12* (2019.01)

(56) References Cited

U.S. PATENT DOCUMENTS

| | | | | |
|---|---|---|---|---|
| 2007/0050120 | A1* | 3/2007 | Tabata | B60K 6/44 |
| | | | | 701/80 |
| 2008/0264026 | A1* | 10/2008 | Ishii | A01D 34/44 |
| | | | | 56/10.8 |
| 2010/0151989 | A1* | 6/2010 | Read | B60K 6/12 |
| | | | | 477/4 |
| 2011/0127962 | A1* | 6/2011 | Murao | H02J 7/0016 |
| | | | | 320/118 |
| 2012/0038326 | A1* | 2/2012 | Endo | B60K 6/445 |
| | | | | 320/162 |
| 2013/0027048 | A1* | 1/2013 | Schwarz | H01M 10/44 |
| | | | | 324/427 |
| 2014/0222270 | A1* | 8/2014 | Tsutsumi | B60W 20/40 |
| | | | | 701/22 |
| 2015/0134160 | A1* | 5/2015 | Liang | B60W 10/06 |
| | | | | 701/22 |

* cited by examiner

BATTERY ELECTRIC VEHICLE

CROSS-REFERENCE TO RELATED APPLICATION

This application claims priority to Taiwanese Patent Application No. 105102005, filed Jan. 22, 2016, which is incorporated herein by reference.

FIELD OF THE INVENTION

The present invention relates to a battery electric vehicle, and more particularly to a battery electric vehicle with long battery life.

BACKGROUND OF THE INVENTION

The operating principle of battery electric vehicle is that an electric motor converts electrical energy into kinetic energy which is subsequently transferred to a wheel/wheels to drive a battery electric vehicle. When the electric motor rotates forward, the electricity of the batteries is consumed to drive the battery electric vehicle moving forward. On the other hand, when the battery electric vehicle brakes, the electric motor, which is appropriately configured, can act as an electric generator which converts the kinetic energy caused from braking into electrical energy, by which the generated electrical energy is stored back to the batteries. Accordingly, a mechanism of energy recycle can be achieved.

However, for a traditional battery electric vehicle, energy recycling only happens for few circumstances, such as the battery electric vehicle being in a situation of braking or going downhill. Therefore, the proportion of recycled energy is relatively small, which causes the battery electric vehicle to have poorer battery life and weaker competition compared with a hybrid vehicle. In other words, the lifespan of electric vehicles battery has not yet been improved radically.

SUMMARY OF THE INVENTION

Accordingly, the objective of the present invention is to provide a battery electric vehicle with long battery life.

The battery electric vehicle of the present invention comprises a vehicle body having a plurality of wheels, an electric motor, an electric generator, and an electricity management device. The electric motor is connected to one of the plurality of wheels for driving the wheel which is connected to the electric motor to a rotating. The electric generator is connected to another one of the plurality of wheels for generating electricity by converting the rotational kinetic energy of said another one of the plurality of wheels connected to the electric generator into electrical energy. The electricity management device includes a management and controlling member, a detecting member, and a plurality of battery packs. The management and controlling member electrically connects to the detecting member and the plurality of battery packs. The detecting member detects the electrical quantity of each battery pack to obtain a detecting result. The management and controlling member controls at least one of the battery packs to provide electricity to the electric motor by electrically connecting at least said one of the battery packs to the electric motor according to the detecting result, while the management and controlling member controls at least one battery pack other than at least said one of the battery packs providing electricity to the electric motor to be charged by receiving the electricity generated by the electric generator by means of electrically connecting at least one battery pack other than at least said one of the battery packs providing electricity to the electric generator.

According to one embodiment of the present invention, the management and controlling member controls the battery pack with the highest electrical quantity among the plurality of battery packs to provide electricity to the electric motor by electrically connecting the battery pack with the highest electrical quantity to the electric motor according to the detecting result.

According to one embodiment of the present invention, the management and controlling member controls the battery pack/packs among the plurality of battery packs with electrical quantity/quantities higher than a preset electrical quantity to provide electricity to the electric motor by electrically connecting the battery pack/packs among the plurality of battery packs with electrical quantity/quantities higher than the preset electrical quantity to the electric motor according to the detecting result.

According to one embodiment of the present invention, the management and controlling member controls the battery pack with the lowest electrical quantity among the battery packs to be charged by receiving the electricity generated by the electric generator via electrically connecting the battery pack with the lowest electrical quantity among the battery packs to the electric generator according to the detecting result.

According to one embodiment of the present invention, the management and controlling member controls the battery pack with electrical quantity lower than a preset electrical quantity to be charged by receiving the electricity generated by the electric generator via electrically connecting the battery pack with electrical quantity lower than the preset electrical quantity to the electric generator according to the detecting result.

According to one embodiment of the present invention, the electric motor is a permanent-magnet electric motor.

According to one embodiment of the present invention, the electric motor has a plurality of rotors, and the magnetic poles of the rotors are mutually staggered.

By means of the technology of the present invention, the electric motor receives electrical energy from battery packs to drive a wheel rotating, and the electric generator converts the rotational kinetic energy of another wheel into electrical energy to charge other battery packs so that electrical driving and electricity generating can be fulfilled simultaneously. In other words, while the battery electric vehicle consumes electrical energy to move forward, part of the electrical energy is being recycled by the electric generator. Although the amount of electrical energy consumed by the electric motor when driving the battery motor vehicle is therefore increased, the energy recovery efficiency of the electric generator is also increased. Thus, the overall energy dissipation rate of the battery electric vehicle is decreased, extending the battery life of the battery electric vehicle. Besides, when the electrical quantity of the battery pack electrically connected to the electric motor is too low and the electrical quantity of the battery pack electrically connected to the electric generator is too high, the management and controlling member can controls the electric motor and the electric generator to be electrically connected to other battery packs so that the electrical quantity of each battery packs can be managed appropriately, wherein the electrical quantities of battery packs can be distributed properly, and can prevent an occurrence of lifetime reduction for battery packs because of being overcharged or being in low quantity level during a long time period.

BRIEF DESCRIPTION OF THE DRAWINGS

The structure and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

The embodiments of the present invention are described below with reference to FIG. 1 to FIG. 3. The description is for describing the preferred embodiments of the present invention, and is not intended to limit the way of embodying the present invention.

Figure 1:
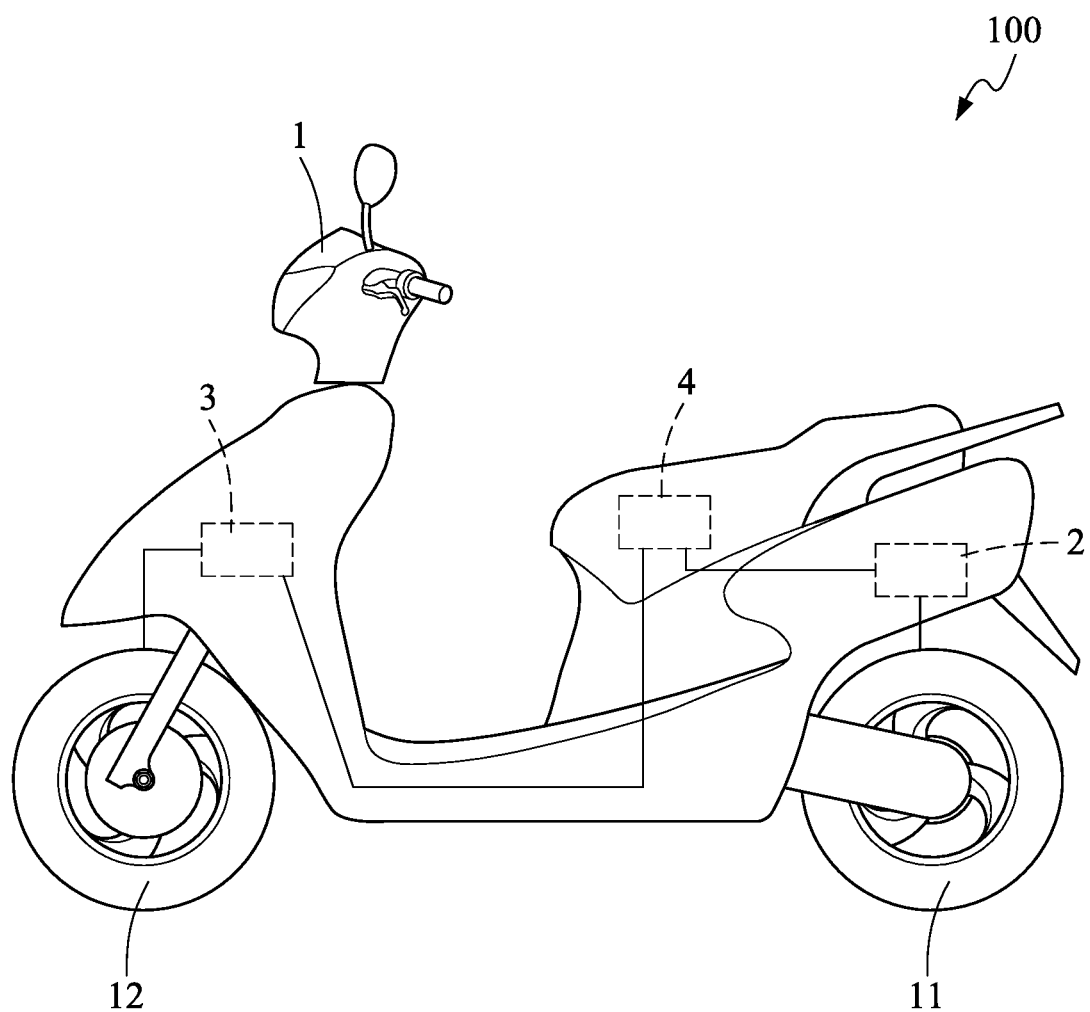
FIG. 1 is a schematic diagram illustrating the battery electric vehicle according to one embodiment of the present invention.
Figure 2:
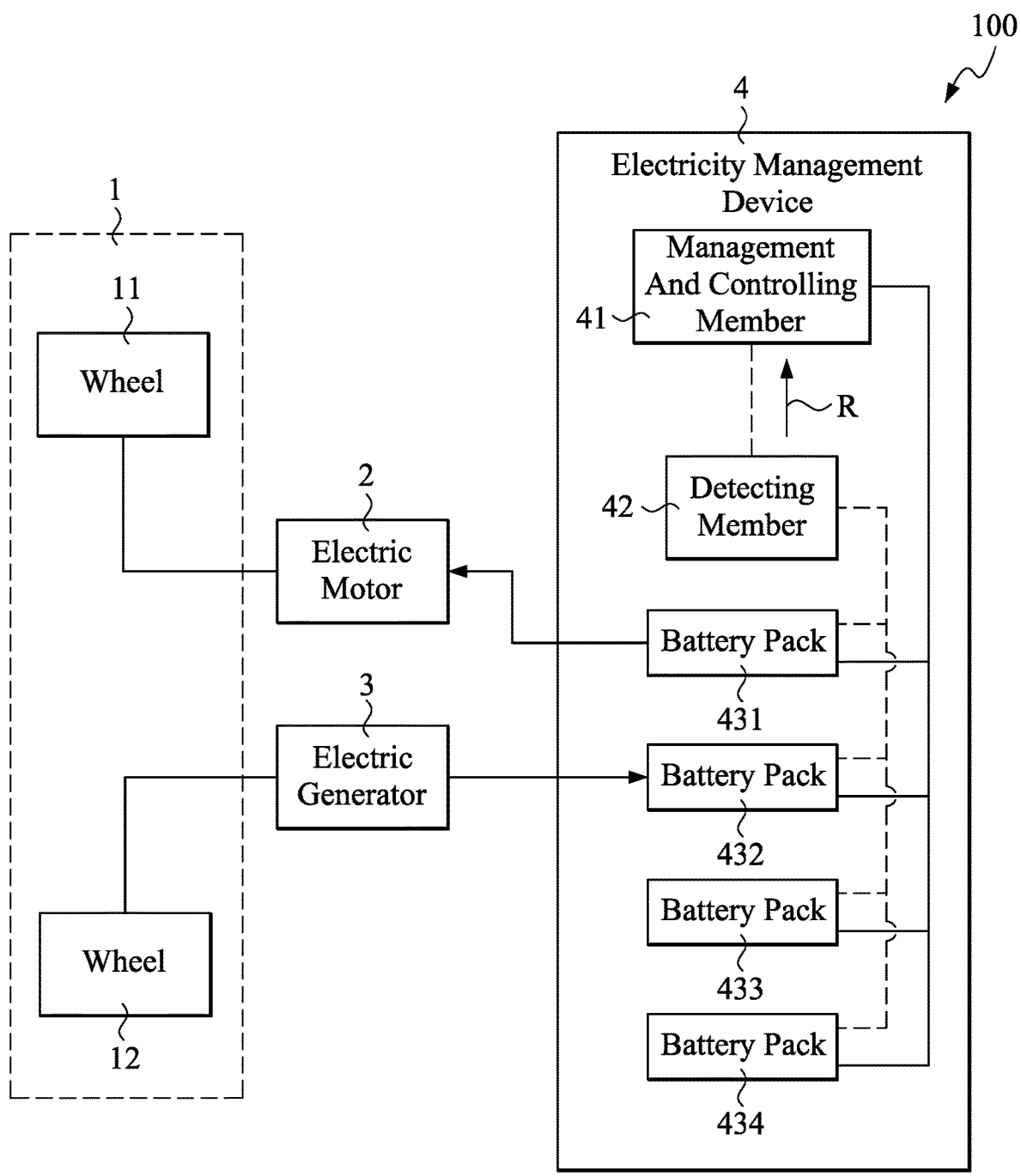
FIG. 2 is a block diagram illustrating the battery electric vehicle according to the embodiment of the present invention.
Figure 3:
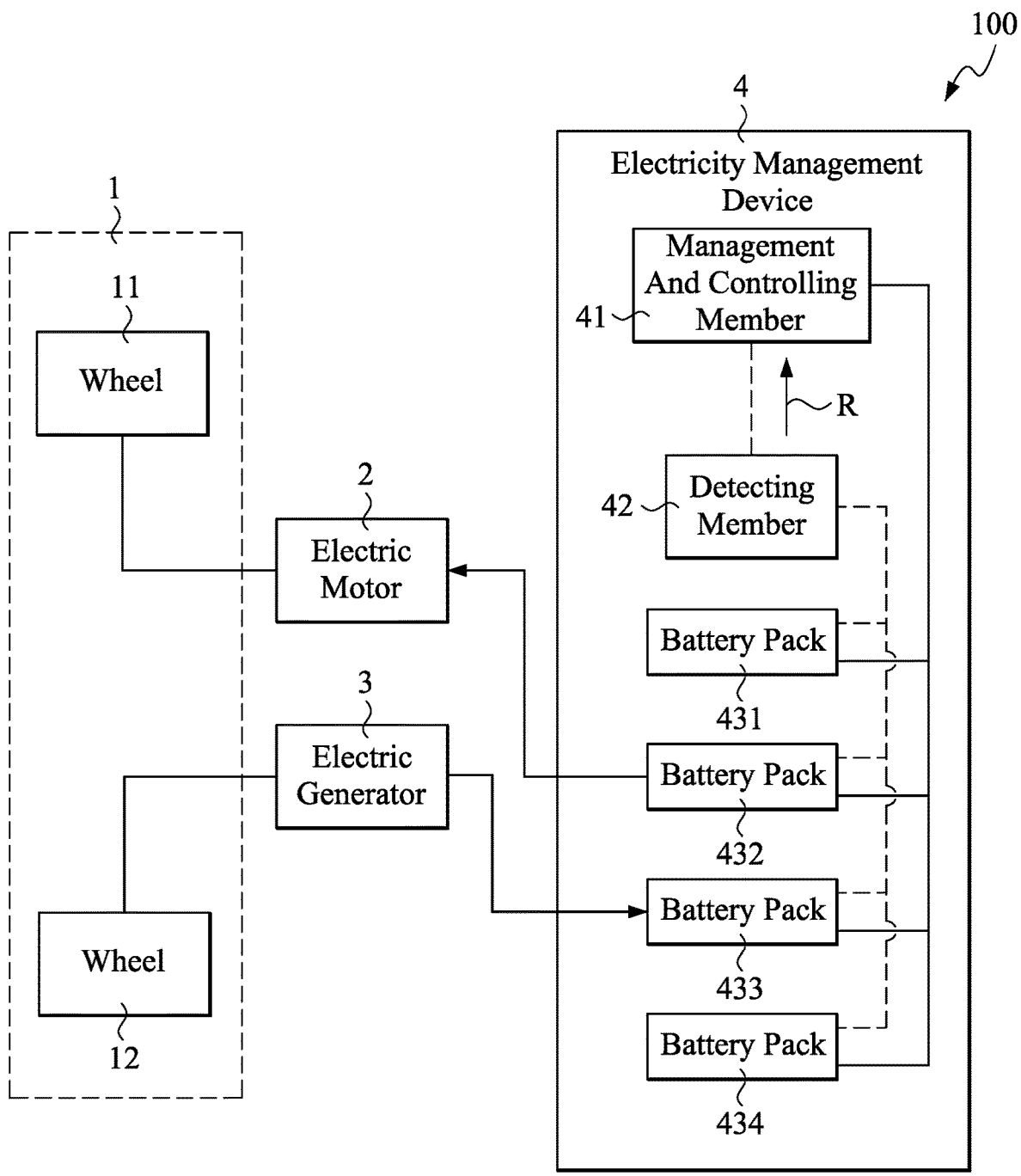
FIG. 3 is another block diagram illustrating the battery electric vehicle according to the embodiment of the present invention.

Please refer to FIGS. 1 to 3, a battery electric vehicle 100 according to one embodiment of the present invention includes a vehicle body 1, an electric motor 2, an electric generator 3 and an electricity management device 4.

In the embodiment, the vehicle body 1 is a body of electric motorcycle, and the vehicle body 1 has a rear wheel 11 and a front wheel 12. However, the present invention is not limited to this. The vehicle body 1 can also be a body of an electric bicycle, an electric car, or an electric bus, and can have three, four, or more wheels.

The electric motor 2 is connected to the rear wheel 11 for driving the rear wheel 11 rotating. Furthermore, in the embodiment, the electric motor 2 is a permanent-magnet electric motor, and the electric motor 2 has a plurality of rotors. Along the rotational direction of the electric motor 2, the magnetic poles of the plurality of rotors are mutually staggered, and such design can effectively reduce reluctance torque which causes energy loss. As a result, the energy conversion efficiency of electric motor 2 is improved.

The electric generator 3 is connected to the front wheel 12 for generating electricity by converting the rotational kinetic energy of the front wheel 12 into electrical energy. It is noteworthy that the wheel connected to the electric generator 3 is a different wheel from that connected to the electric motor 2 in such a manner that the electric generator 3 generates electricity independently without being affected by the electric motor 2. In the embodiment, the electric generator 3 and the electric motor 2 are disposed to connect the front wheel 12 and the rear wheel 11 respectively, but the above configuration can also be the other way around, that is, the electric motor 2 be disposed to connect the front wheel 12 and the electric generator 3 be disposed to connect the rear wheel 11. However, since the electric motor 2 is used for accelerating and braking the vehicle body 1, the electric motor 2 connecting to the rear wheel 11 prevents rollover while braking.

The electricity management device 4 includes a management and controlling member 41, a detecting member 42, and a plurality of battery packs 431, 432, 433, and 434. In the beginning of the present embodiment, the battery pack 431 is set to electrically connected to the electric motor 2 and provides electricity to the electric motor 2, and the battery pack 432 is set to electrically connected to the electric generator 3 so as to be charged by receiving the electricity generated by the electric generator 3. However, the present invention is not limited to this. It can also be a plurality of battery packs that electrically connect to the electric motor 2 to provide the electric motor 2 with electricity, and a plurality of battery packs that electrically connect to the electric generator 3 to be charging by receiving the electricity generated by the electric generator 3.

After a period of time, the electrical quantity of the battery pack 431 is decreased owing to providing electricity, and the electrical quantity of the battery pack 432 is increased owing to being charged. The detecting member 42 detects the electrical quantities of the plurality of battery packs 431, 432, 433, and 434 respectively to obtain a detecting result R, wherein the battery pack 432 is with the highest electrical quantity and the battery pack 433 is with the lowest electrical quantity. As shown in FIG. 3, when the electrical quantity of the battery pack 431 electrically connected to the electric motor 2 is lower than a preset value, the management and controlling member 41 controls the electric motor 2 to receive electricity from the batter pack 432 by electrically connecting to the battery pack 432 according to the detecting result R, and the battery pack 431 stops providing the electric motor 2 with electricity. The preset value can be a fixed value, such as 20% electrical quantity, or a non-fixed value, such as the average value of electrical quantity of the battery packs, the value of the electrical quantity of the battery pack with highest electrical quantity, or the value which is the difference between the value of electrical quantity of battery pack with the highest electrical quantity and the value of electrical quantity of the battery pack 431. For example, if the electrical quantity of the battery pack 432 is 95%, and the electrical quantity of the battery pack 431 is lower than 45% so that the electrical quantities of the battery packs 432 and 431 differ by 50%, the management and controlling member 41 controls the electric motor 2 to receive electricity from the battery pack 432.

In the present embodiment, the management and controlling member 4 controls the battery pack 432 with the highest electrical quantity among the plurality of battery packs 431, 432, 433, and 434 to electrically connect to the electric motor 2 according to the detecting result R. However, the present invention is not limited to this. The management and controlling member 4 is capable of controlling the battery pack/packs among the plurality of battery packs with electrical quantity/quantities higher than a preset electrical quantity to provide electricity to the electric motor 2 by electrically connecting to the electric motor 2 according to the detecting result R.

On the other hand, when the electrical quantity of the battery pack 432 which is electrically connected to the electric generator 3 is higher than a preset value, the management and controlling member 41 controls the battery pack 433 to be charged by receiving the electricity generated by the electric generator 3 by means of electrically connecting the battery pack 433 to the electric generator 3 according to the detecting result R. The battery pack 432 originally electrically connected to the electric generator 3 thus no longer receives electricity from electric generator 3. The preset value can be a fixed value, such as 90% electrical quantity, or a non-fixed value, such as the average value of electrical quantity of the battery packs, the value of electrical quantity of the battery pack with the lowest electrical quantity, or the value which is the difference between the value of electrical quantity of battery pack with the highest electrical quantity and the value of electrical quantity of the battery pack 432. For example, if the electrical quantity of the battery pack 433 is 35%, and the electrical quantity of the battery pack 432 is higher than 85% and such that the electrical quantities of battery packs 433 and 432 differ by 50%, the management and controlling member 41 controls the battery pack 433 to electrically connect to the electric generator 3.

In the present embodiment, the management and controlling member 41 controls the battery pack 433 with the lowest electrical quantity among the battery packs 431, 432, 433, and 434 to be electrically connected to the electric generator 3 according to the detecting result R. However, the present invention is not limited to this. The management and controlling member 41 is capable of controlling the battery pack/packs among the plurality of battery packs with electrical quantity/quantities lower than a preset value to be charged by receiving the electricity generated by the electric generator 3 via electrically connecting the battery pack with electrical quantity lower than the preset electrical quantity to the electric generator 3 according to the detecting result R.

Therefore, when the electrical quantity of the battery pack 431 electrically connected to the electric motor 2 is low, the management and controlling member 41 is capable of controlling the electric motor 2 to be electrically connected to other battery pack/packs, which is the battery pack 432 with highest electrical quantity in the present embodiment, according to the detecting result R. And when the electrical quantity of the battery pack 432 is above a certain level, the management and controlling member 41 is capable of controlling the electric generator 3 to be electrically connected to at least one of other battery packs, which is the battery pack 433 with lowest electrical quantity in the present embodiment, according to the detecting result R.

By the above structure, the energy of the battery electric vehicle 100 in the present invention can be effectively recycled by the electric generator 3 for enhancing the battery life of the battery electric vehicle 100. Besides, the electricity of the battery electric vehicle 100 can be controlled and used appropriately via the electricity management device 4. The present invention ensures the battery packs being maintained in a safe range of electrical quantities without being overcharged or being in low electrical quantity for a long time, further ensuring the maintenance of the lifetime of the battery packs.

The above description should be considered as only the discussion of the preferred embodiments of the present invention. However, a person skilled in the art may make various modifications without deviating from the present invention. Those modifications still fall within the spirit and scope defined by the appended claims.

What is claimed is:

1. A battery electric vehicle, comprising:
   a vehicle body having at least one driving wheel and at least one non-driving wheel, wherein the axle of the driving wheel is independent to and different from the axle of the non-driving wheel;
   an electric motor connected to the driving wheel through the axle of the driving wheel to drive the driving wheel rotating;
   an electric generator being independent of the electric motor, the electric generator connected to and driven by the non-driving wheel through the axle of the non-driving wheel such that the rotational kinetic energy of the non-driving wheel is converted by the electric generator into electrical energy and the non-driving wheel connected to the electric generator is different from the driving wheel connected to the electric motor; and
   an electricity management device including a management and controlling member, a detecting member, and a plurality of battery packs which store the electrical energy converted by the electric generator,
   wherein the management and controlling member electrically connects to the detecting member and the plurality of battery packs, the detecting member keeps detecting the electrical quantity of each battery pack to obtain a detecting result of each battery pack of the plurality of battery packs, the management and controlling member performs a selection from the plurality of battery packs according to the present detecting result of each battery pack of the plurality of battery packs to determine at least one selected battery pack as an electric supplying battery pack and at least one non-selected battery pack, as an electric charging battery pack, other than said at least one selected battery pack, the management and controlling member electrically connects the electric supplying battery pack to the electric motor, and the management and controlling member electrically connects the electric charging battery pack to the electric generator according to the detecting result in such a manner that an operation that the connected electric supplying battery pack provides electricity to the electric motor for driving the driving wheel and an operation that the connected electric charging battery pack stores the electrical energy converted from the rotational kinetic energy of the non-driving wheel by the electric generator are operated simultaneously according to the detecting result of each battery pack of the plurality of battery packs, the electric generator converts the rotational kinetic energy of the non-driving wheel into electrical energy and then the converted electrical energy is then transferred to the connected electric charging battery pack according to the detecting result of each battery pack of the plurality of battery packs.

2. The battery electric vehicle of claim 1, wherein the management and controlling member controls the battery pack with the highest electrical quantity among the plurality of battery packs to provide electricity to the electric motor by electrically connecting the battery pack with the highest electrical quantity to the electric motor according to the detecting result.

3. The battery electric vehicle of claim 1, wherein the management and controlling member controls the battery pack/packs among the plurality of battery packs with electrical quantity/quantities higher than a preset electrical quantity to provide electricity to the electric motor by electrically connecting the battery pack/packs among the plurality of battery packs with electrical quantity/quantities higher than a preset electrical quantity to the electric motor according to the detecting result.

4. The battery electric vehicle of claim 1, wherein the management and controlling member controls the battery pack with the lowest electrical quantity among the battery packs to be charged by receiving the electricity generated by the electric generator via electrically connecting the battery pack with the lowest electrical quantity among the battery packs to the electric generator according to the detecting result.

5. The battery electric vehicle of claim 1, wherein the management and controlling member controls the battery pack with electrical quantity lower than a preset electrical quantity to be charged by receiving the electricity generated by the electric generator via electrically connecting the battery pack with electrical quantity lower than the preset electrical quantity to the electric generator according to the detecting result.

6. The battery electric vehicle of claim 1, wherein the electric motor is a permanent-magnet electric motor.

7. The battery electric vehicle of claim 6, wherein the electric motor has a plurality of rotors, and the magnetic poles of the rotors are mutually staggered.

\* \* \* \* \*